United States Patent
Washburn

(10) Patent No.: US 6,940,852 B1
(45) Date of Patent: Sep. 6, 2005

(54) PROBABILISTIC COUNTER

(75) Inventor: James G. Washburn, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 934 days.

(21) Appl. No.: 09/745,743

(22) Filed: Dec. 26, 2000

(51) Int. Cl.[7] ............................................ H04J 3/16
(52) U.S. Cl. ............................................ 370/389
(58) Field of Search ............................ 370/229, 230, 370/231, 232, 233, 234, 235, 236, 252, 254, 370/428, 412, 413, 414, 415, 416, 417, 418, 370/465, 351, 352, 384, 395.1

(56) References Cited

U.S. PATENT DOCUMENTS 6,504,838 B1 * 1/2003 Kwan ........................ 370/352

* cited by examiner

*Primary Examiner*—Dang Ton
(74) *Attorney, Agent, or Firm*—Harrity & Snyder LLP

(57) ABSTRACT

A statistically based counter increments a count value based on a random probability. As the count value increases, the probability of increasing the count value is decreased. The count value is stored as the combination of an exponent and a mantissa. In this manner, the count value can count up to a very large dynamic range while using a relatively small storage area for the count value.

31 Claims, 4 Drawing Sheets

PROBABILISTIC COUNTER

BACKGROUND OF THE INVENTION

A. Field of the Invention

The present invention relates generally to counters and, more particularly, to counters designed to count a large number of items.

B. Description of Related Art

Conventional networks typically include routers that route packets from one or more sources to one or more destinations. A packet is a variable size record that is transmitted through a network. A router is a network device that receives packets containing data and control information at input ports, and, based on destination or other information included in the packets, routes the packets to appropriate output ports that lead to either the next router in the packet's journey or to the packet's final destination. Routers determine the proper output port for a particular packet by evaluating header information included in the packet.

Routers have the capability to drop packets in a controlled fashion. This facility is used by network operators to control the amount of traffic entering or leaving a network on a given port. For diagnostic and record keeping purposes, it may be desirable for the router to keep a running total of the number of dropped packets, and the total number of bytes in the packets. In modern, high-performance routers, which may process millions of packets per second, the number of dropped packets can accrue quickly. Keeping track of the total number of dropped packets, and especially the total number of bytes dropped, may thus require large hardware registers (e.g., 64 bits or more) that can be time consuming to update.

Thus, there is a need in the art to be able to efficiently keep a counter capable of quickly counting a large number of items.

SUMMARY OF THE INVENTION

Systems and methods consistent with the present invention address this and other needs by providing a high-speed probabilistic counter.

More particularly, one aspect of the present invention is directed to a method of probabilistically counting a series of items. The method includes generating a random number in a range defined by a first value. The random number is used to determine if the count value should be increased. Specifically, the count value is increased when the generated random number is less than a second value. Finally, the range of the generated random number is increased when the count value has been increased a predetermined amount.

Another aspect of the present invention is directed to a counter for probabilistically counting a plurality of items. The counter includes a random number generator configured to generate a random number in a range defined by a first value and a count value register for holding a representation of a present count of the items. The count value register includes a mantissa portion and an exponent portion. An adder is connected to the count value register. The adder increments the portion of the count value register that holds the mantissa when the generated random number is less than a value based on at least one of the items. The adder increments the portion of the count value register that holds the exponent when the portion that holds the mantissa overflows. An update component recalculates the first value as a higher value when the exponent is increased by the adder.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

As described herein, a probabilistic counter includes a storage register divided into an exponent and a mantissa. The counter is probabilistically incremented based on the current count. The probability of incrementing the counter decreases as the count of the counter increases. The counter has a large dynamic range and approximately constant precision relative to the number of counted items. The counter is easily updated and can be implemented using a relatively small storage register.

Figure 1:
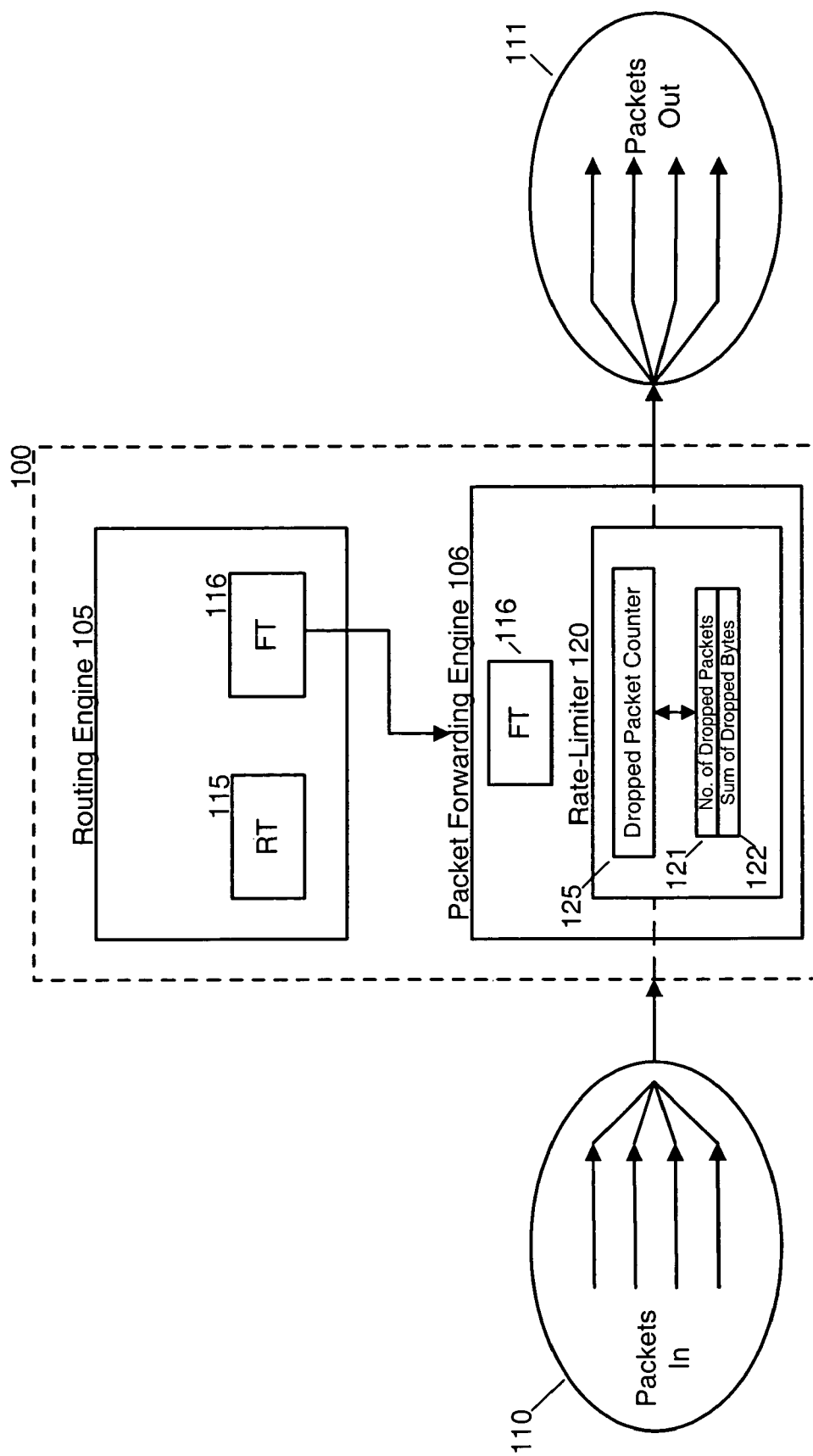
FIG. 1 is a diagram illustrating, at a high-level, functional components of an exemplary network router.

The statistically based counter consistent with the present invention may be implemented in the context of a network device, such as a router. FIG. 1 is a diagram illustrating, at a high-level, functional components of an exemplary router 100. In general, router 100 receives incoming packets 110, determines the next destination (the next "hop" in the network) for the packets, and outputs the packets as outbound packets 111 on physical links that lead to the next destination. In this manner, packets "hop" from router to router in a network until reaching their final destination.

Router 100 includes routing engine 105 and a packet forwarding engine (PFE) 106. Routing engine 105 may maintain one or more routing tables (RTs) 115 and a forwarding table (FT) 116. Through routing tables 115, routing engine 105 consolidates routing information that the routing engine learns from the routing protocols of the network. From this routing information, the routing protocol process may determine the active routes to network destinations and install these routes into forwarding table 116. Packet forwarding engine 106 may consult forwarding table 116 when determining the next destination for incoming packets 110.

If more incoming packets 110 are received at router 100 than the router can handle or is configured to accept, it may "drop" some of the packets. For a dropped packet to successfully arrive at its destination, it must be retransmitted by its transmitting source.

Figure 2:
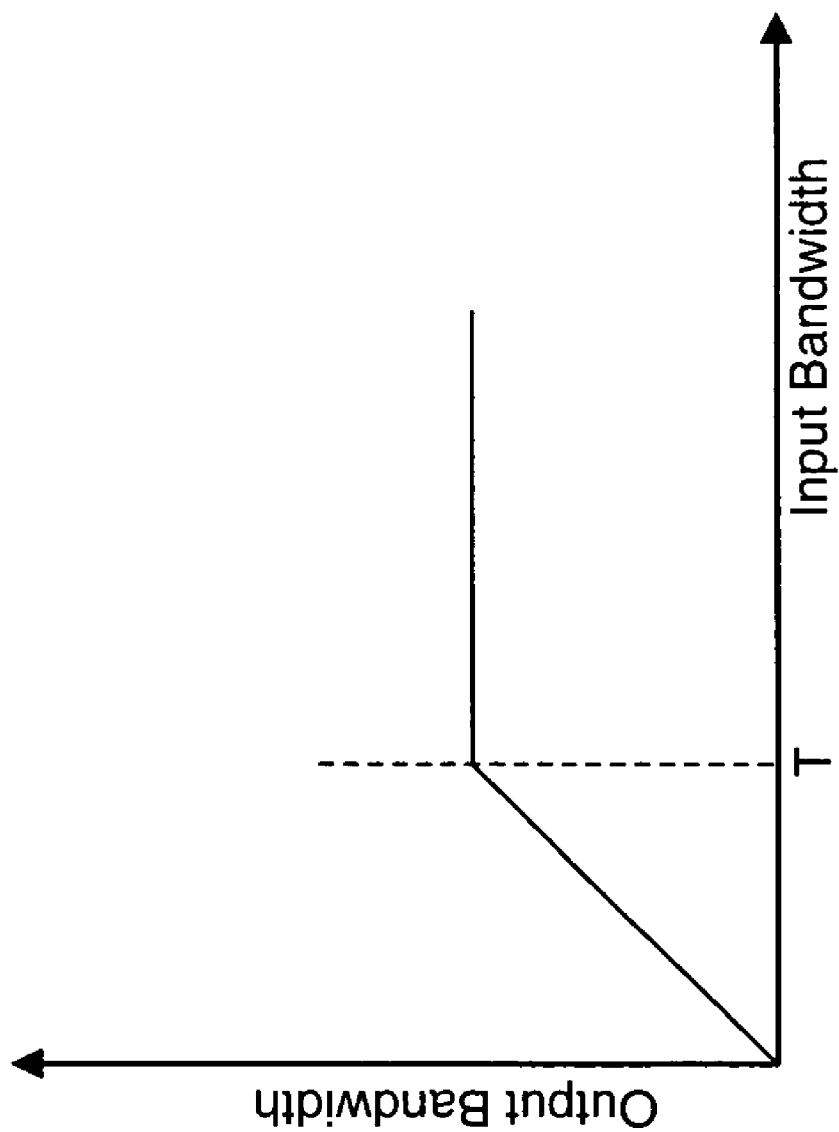
FIG. 2 is a graph illustrating the operation of a rate-limiter in the router shown in FIG. 1.

Router 100 includes a rate-limiter 120 that drops packets when the input bandwidth of the input packets 110 is larger than what the router has been configured to accept. FIG. 2 is a graph illustrating the operation of rate-limiter 120. As shown, rate-limiter 120 operates to limit the output packet bandwidth when the input bandwidth is greater than a threshold value, T. The threshold may be set based on desired operating parameters. Below the threshold, the rate-limiter 120 allows all of the incoming packets 110 to pass.

Returning to FIG. 1, rate-limiter 120 may include storage elements, such as registers 121 and 122, that store information relating to dropped packets, such as the number of dropped packets or the total number of bytes of the dropped packets. This information is updated in registers 121 and 122 by the dropped packet counter 125 (described in more detail below).

Registers 121 and 122 may each be 32 bits in size. A 32-bit register, if interpreted as a single unsigned number, can count as high as about 4.3 billion. Values higher than this will overflow the register. As described below, however, dropped packet counter 125 updates register 121 and 122 in a manner such that overflow is not an issue.

Dropped packet counter 125 will now be described in more detail with reference to FIGS. 3 and 4.

Figure 3:
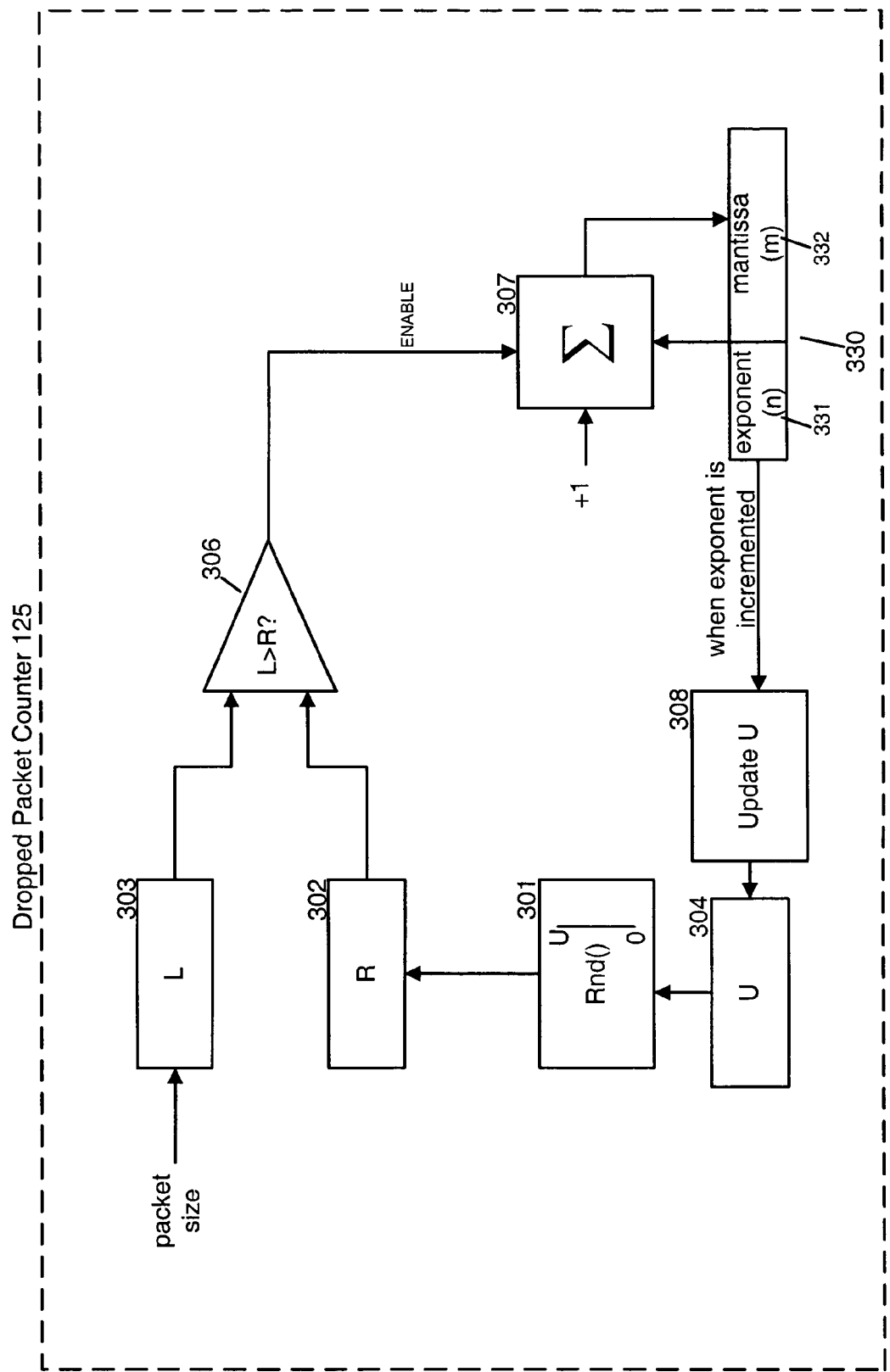
FIG. 3 is an exemplary block diagram illustrating functional relationships between components in a dropped packet counter in the rate-limiter.
Figure 4:
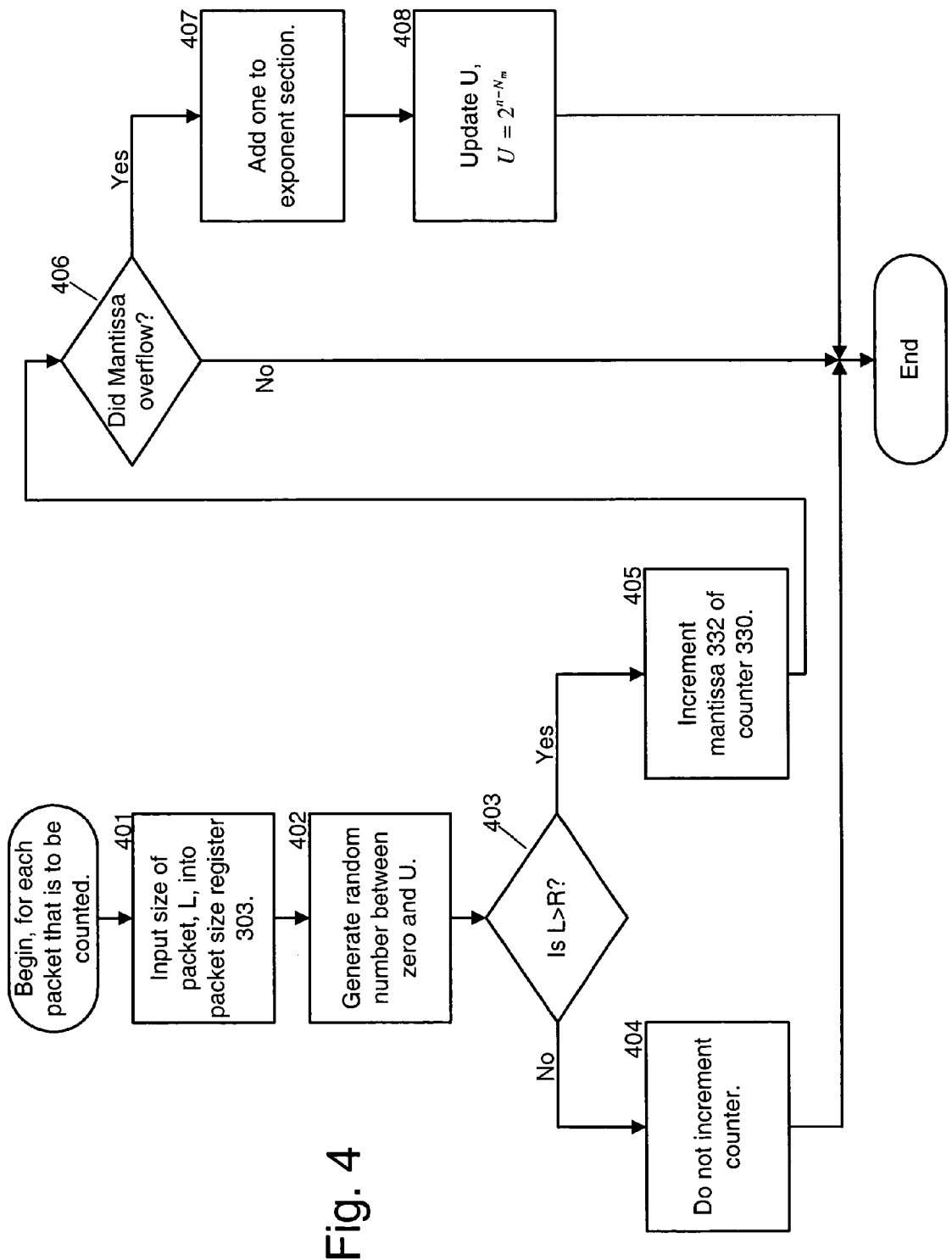
FIG. 4 is a flow chart illustrating methods consistent with the present invention for operating the dropped packet counter.

FIG. 3 is an exemplary block diagram illustrating functional relationships between components in dropped packet counter 125. As shown, dropped packet counter 125 includes a packet size storage register (L) 303, a units variable storage register (U) 304, and a random number storage register (R) 302. A random number generator 301 supplies random number register 302 with random numbers. A comparator 306 receives values from random number register 302 and packet size register 303. An adder, under the control of comparator 306, increments a count value register 330, which may be, for example, register 121 or 122. Based on the value in count value register 330, update component 308 updates unit variable register 304.

Count value register 330 contains the running total of the count and may be divided into two sections, exponent section 331 and mantissa section 332. If count value register 330 is a 32-bit register, exponent section 331 and mantissa section 332 may be, for example, 6 bits and 26 bits in length, respectively. The value stored in register 330 is an estimation of the true count value of the number of total dropped packets. The estimate of the count value may be defined as:

$$2^n + m \cdot 2^{n-N_m},$$

where m is the value in mantissa section 332, n is the value is exponent section 331, and $N_m$ is the length, in bits, of the mantissa section 332.

The operation of dropped packet counter 125 will be further described with reference to the flow chart of FIG. 4.

To begin, for each dropped packet, the length of the packet, L, is received by packet size register (L) 303. (Act 401). Random number generator 301 generates a random number, R, between zero and the value of the units variable, U, that is stored in units variable register 304. (Act 402). Comparator 306 determines whether L is greater than R. (Act 403). If L is not greater, the algorithm terminates for this iteration (Act 404). If L is greater than R, comparator 306 instructs adder 307 to increment the mantissa 332 of count value register 330 by one. (Act 405).

Eventually, mantissa section 332 may reach its maximum value. If mantissa section 332 is, for example, 26 bits, its maximum value is 67,108,863. Incrementing mantissa section 332 beyond this point will cause it to overflow. In particular, if one is added to the mantissa section 332 when it is at its maximum value, it will reset to zero. When this overflow condition occurs, adder 307 adds one to exponent section 331. (Acts 406 and 407). In practice, adder 307 may treat all of count value register 330 as a single unit. In this situation, resetting mantissa section 332 to zero and adding one to exponent section 331 all occur as a natural consequence of adding one to count value register 330.

When the exponent section is increased, update component 308 recalculates and stores the updated value in unit variable register 304. U may be calculated based on the value in exponent section 331 (n), and on the length ($N_m$) of the mantissa section 332, as:

$$U = 2^{n-N_m}.$$

In this manner, U is initially near zero and is steadily increased as the count value increases. The probability of counting a particular packet at any particular time is L/U.

The functional implementation of dropped packet counter 125, as shown in FIG. 3, is exemplary only. One of ordinary skill in the art will recognize that dropped packet counter 125 could be implemented with a variety of different components and configurations.

Dropped packet counter 125, as described above, counts the number of dropped packet bytes using a probabilistic counting scheme. Because every dropped packet is not explicitly added to the count value register 330, the required update speed of count value register 330 can be less than the update speed if every dropped packet were counted, while still maintaining a constant precision as a percent of the count value. Further, because the count value is represented using an exponent and mantissa representation, the dynamic range of the counter can be very large. Finally, the implementation of dropped packet counter 125 is relatively simple, using only a random number generator, storage registers, a comparator, an adder, and a numerical calculating section.

Although described in the context of a counter counting dropped packets for a router, the concepts consistent with the present invention are not limited to implementation within a router. The dropped packet counter 125 can be generalized to probabilistically count any set of items.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

Although described as being primarily implemented in hardware, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system.

The scope of the invention is defined by the claims and their equivalents.

What is claimed is:

1. A counter for probabilistically counting a plurality of items comprising:
   a random number generator configured to generate a random number in a range defined by a first value;
   a count value register configured to hold a representation of a present count of the items, the count value register including a portion for holding a mantissa of the present count and a portion for holding an exponent of the present count;

an adder connected to the count value register and configured to increment the portion of the count value register that holds the mantissa when the generated random number is less than a second value based on at least one of the plurality of items, and increment the portion of the count value register that holds the exponent when the portion that holds the mantissa overflows; and an update component connected to the count value register and configured to recalculate the first value as a higher value when the exponent is increased by the adder.

2. The counter of claim 1, further comprising:
a comparator connected to receive the random number and the second value and configured to compare the random number to the second value and signal the adder to increment the portion of the count value register that holds the mantissa when the random number is less than the second value.

3. The counter of claim 2, further comprising:
a first register connected to the output of the random number generator and configured to store the random number and supply the random number to the comparator; and
a second register configured to store the second value and supply the second value to the comparator.

4. The counter of claim 1, wherein the range defined by the first value for generating the random number is between zero and the first value.

5. The counter of claim 1, wherein the present count of the counter is a function of the values stored in the mantissa portion and the exponent portion of the count value register, the function being defined by:

$$2^n + m \cdot 2^{n-N_m},$$

where n is the value in the exponent portion, m is the value of the mantissa portion, and $N_m$ is the size of the mantissa portion.

6. The counter of claim 1, wherein the second value is based on a size of the at least one item.

7. The counter of claim 1, wherein the portion of the count value register that holds the mantissa and the portion of the count value register that holds the exponent are implemented as adjacent bits of a memory device that together comprise the count value register, the adder incrementing the portion of the count value register that holds the mantissa by incrementing the count value register.

8. The counter of claim 1, wherein the adder increments the portion of the count value register that holds the mantissa by one.

9. The counter of claim 1, wherein each counted item is a packet in a network.

10. The counter of claim 1, wherein the update component recalculates the first value as $$2^{n-N_m},$$

where n is the value in the exponent portion and $N_m$ is the size of the mantissa portion.

11. A method of probabilistically counting a series of items comprising:
generating a random number in a range defined by a first value;
increasing a count value of the items when the generated random number is less than a second value; and
increasing the range of the generated random number by increasing the first value when the count value has been increased a predetermined amount.

12. The method of claim 11, wherein the range of the random number is between zero and the first value.

13. The method of claim 11, wherein the counted items are dropped packets in a network.

14. The method of claim 13, wherein the second value is based on the size of the dropped packet.

15. The method of claim 11, wherein the count value is implemented as an exponent and a mantissa, the first value being incremented when the mantissa overflows.

16. The method of claim 15, wherein the first value is increased by recalculating the first value as $$2^{n-N_m},$$

where n is the value in the exponent and $N_m$ is the size of the mantissa.

17. The method of claim 15, wherein the count value is $$2^n + m \cdot 2^{n-N_m},$$

where n is the value in the exponent, m is the value of the mantissa, and $N_m$ is the size of the mantissa.

18. A method of probabilistically counting a series of packets, the method, for each packet in the series, comprising:
storing a size of the packet;
generating a random number between zero and a first value;
increasing a count value of the packets when the generated random number is less than the size of the packet, the count value being stored as a combination of an exponent value and a mantissa value; and
recalculating the first value when the increasing of the count value of the packets causes the mantissa to overflow.

19. The method of claim 18, wherein the count value stored as the combination of an exponent value and the mantissa value is given by:

$$2^n + m \cdot 2^{n-N_m},$$

where n is the value in the exponent, m is the value of the mantissa, and $N_m$ is the size of the mantissa.

20. The method of claim 18, wherein increasing the count value of the packets includes increasing the value of the exponent when the mantissa overflows.

21. The method of claim 18, wherein increasing the count value includes increasing the count value by one for each packet.

22. The method of claim 18, wherein the first value is recalculated as $$2^{n-N_m},$$

where n is the value in the exponent and $N_m$ is the size of the mantissa.

23. A network device comprising:
a routing engine configured to maintain at least one routing table that stores routing information for packets in the network; and
a packet forwarding engine configured to receive incoming packets and, based on information in the routing table, forward the packets to a next device in the network, the packet forwarding engine further including a rate-limiter for dropping incoming packets when the input bandwidth of the incoming packets is greater than a maximum capacity of the network device, the rate-limiter including a counter for counting the number of dropped packets, the counter further comprising a random number generator configured to generate a random number in a range defined by a first value;

a count value register configured to hold a representation of a present count of the number of dropped packets, the count value register including a portion for holding a mantissa of the present count and a portion for holding an exponent of the present count;

an adder connected to the count value register and configured to increment the portion of the count value register that holds the mantissa when the generated random number is less than a size of the dropped packet, and increment the portion of the count value register that holds the exponent when the portion that holds the mantissa overflows; and an update component connected to the count value register and configured to recalculate the first value as a higher value when the exponent is increased by the adder.

24. The network device of claim 23, wherein the network device is a network router.

25. The network device of claim 23, wherein the counter further comprises:

a comparator connected to receive the random number and the size of the dropped packet and to compare the random number to the size of the dropped packet and signal the adder to increment the portion of the count value register that holds the mantissa when the random number is less than the size of the dropped packet.

26. The network device of claim 24, wherein the counter further comprises:

a first register connected to the output of the random number generator and configured to store the random number and supply the random number to the comparator; and a second register configured to store the size of the dropped packet and supply the size of the dropped packet to the comparator.

27. The network device of claim 23, wherein the range defined by the first value for generating the random number is between zero and the first value.

28. The network device of claim 23, wherein the present count of the counter is a function of the values stored in the mantissa portion and the exponent portion of the count value register, the function being defined by:

$$2^n + m \cdot 2^{n-N_m},$$

where n is the value in the exponent portion, m is the value of the mantissa portion, and $N_m$ is the size of the mantissa portion.

29. The network device of claim 23, wherein the portion of the count value register that holds the mantissa and the portion of the count value register that holds the exponent are implemented as adjacent bits of a memory device that together comprise the count value register, the adder incrementing the portion of the count value register that holds the mantissa by incrementing the count value register.

30. The network device of claim 23, wherein the adder increments the portion of the count value register that holds the mantissa by one.

31. The network device of claim 23, wherein the update component recalculates the first value as $$2^{n-N_m},$$

where n is the value in the exponent portion and $N_m$ is the size of the mantissa portion.

* * * * *